(12) United States Patent
Koike et al.

(10) Patent No.: US 7,473,781 B2
(45) Date of Patent: Jan. 6, 2009

(54) AGENT FOR CAPTURING SUBSTANCE HAVING ANIONIC SUBSTITUENT

(75) Inventors: Tohru Koike, Hiroshima (JP); Yohsuke Yamamoto, Hiroshima (JP); Hironori Takeda, Hiroshima (JP); Yoshio Sano, Hiroshima (JP); Satoko Yougai, Hiroshima (JP)

(73) Assignee: Manac Inc., Hiroshima (JP)

( * ) Notice: Subject to any disclaimer, the term of this patent is extended or adjusted under 35 U.S.C. 154(b) by 609 days.

(21) Appl. No.: 10/547,050

(22) PCT Filed: Mar. 4, 2004

(86) PCT No.: PCT/JP2004/002730

§ 371 (c)(1),
(2), (4) Date: Aug. 26, 2005

(87) PCT Pub. No.: WO2004/078828

PCT Pub. Date: Sep. 16, 2004

(65) Prior Publication Data

US 2006/0131239 A1 Jun. 22, 2006

(30) Foreign Application Priority Data

Mar. 4, 2003 (WO) .................. PCT/JP03/02484

(51) Int. Cl.
- *C07F 3/06* (2006.01)
- *C07K 17/00* (2006.01)
- *C08G 79/00* (2006.01)

(52) U.S. Cl. .................. 546/6; 210/660; 530/416; 530/417; 528/395

(58) Field of Classification Search ............... 546/6; 210/660; 530/416, 417; 528/395
See application file for complete search history.

(56) References Cited

U.S. PATENT DOCUMENTS 4,649,111 A  3/1987  Keller et al.

FOREIGN PATENT DOCUMENTS

| JP | 58-67192 | 4/1983 |
| WO | WO-96/28251 A1 | 9/1996 |
| WO | WO-03-053932 A1 | 7/2003 |

OTHER PUBLICATIONS

Morio Yashiro et al., "Preparation and Study of Dinuclear Zinc(II) Complex for the Efficient Hydrolysis of the Phosphodiester Linkage in a Dirbonucleotide", Journal of the Chemical Society, Chemical Communications, 1995, No. 17, pp. 1793-1794, 3 pages.
Japanese Office Action for Japanese Patent Application No. 2005-503096, mailed Feb. 26, 2008, and English translation thereof, 8 pages.
Supplementary European Search Report; issued Jul. 12, 2006 in Application No. 04717273.9 (3 pages).
S. Aoki et al., "Highly Selectice Recognition of Thymidine Mono- and Diphosphate Nucleotides in Aqueous Solution by Ditopic Receptors Zinc(II)-Bis(cyclen) Complexes (Cyclen = 1,4,7,10-Tetraazacyclododecan)," Journal of the American Chemical Society, May 17, 2000, vol. 122, No. 19, pp. 4542 to 4548 (7 pages).
E. Kimura et al., "A Tris ($Zn^{II}$ - 1,4,7,10-tetraazacyclododecane) Complex as a New Receptor for Phosphate Dianions in Aqueous Solution," Journal of the American Chemical Society, Apr. 2, 1997, vol. 119, No. 13, pp. 3068 to 3076 (9 pages).
H. Chaumeil et al., "Nouvelles Resines Echangeuses D'ions Chelatantes Contenant Des Ligands Tetraazamacrocycliques," European Polymer Journal, 1991, vol. 27, No. 3, pp. 269-275 (7 pages).

*Primary Examiner*—Porfirio Nazario Gonzalez
(74) *Attorney, Agent, or Firm*—Osha • Liang LLP

(57) ABSTRACT

A polymer carrier to which a prescribed zinc complex group is binding directly or through a spacer, having property to bond, under a certain condition, to an anionic substituent (a phosphate group, for example), showing low solubility to a solvent (preferably insolubility to a solvent) as a whole, and being capable of capturing, separating and purifying easily a substance having an anionic substituent (a phosphate group, for example).

31 Claims, 4 Drawing Sheets

AGENT FOR CAPTURING SUBSTANCE HAVING ANIONIC SUBSTITUENT

TECHNICAL FIELD

The present invention relates to a polymer carrier to which a prescribed zinc complex group is binding, a capturing agent containing the said polymer carrier for capturing a substance having an anionic substituent (phosphate group, for example), further a capturing apparatus filled with the said capturing agent, and a method for the capture thereof, which are useful for separating and purifying a substance having an anionic substituent (phosphate group, for example).

BACKGROUND ART

As a method for analyzing a substance having a phosphate group, for example a phosphorylated biological substance and the like, a method based on enzyme-linked immunosorbent assay (ELISA) or a method utilizing a radioisotope has been known.

The enzyme-linked immunosorbent assay utilizes a principle that an antibody (or an antigen as well) bonds specifically to a target substance. Hence, there is a problem that it is necessary to obtain and purify a large quantity of the intended substance for preparing specific antibody against the intended substance. Further, there is another problem that it requires a long time to prepare an antibody since immune response of an animal is used for the preparation thereof. In addition, there is a problem that an antibody against a phosphorylated site in a molecular structure of a few kDa (Dalton) or less cannot be prepared and therefore a phosphorylated biological substance having such a molecular structure cannot be analyzed by an enzyme-linked immunosorbent assay.

Furthermore, a method using a radioisotope employs a radioisotope, $^{32}$P. Consequently, there is a problem that it is accompanied by complicated operations of radiation control and waste water management in a laboratory.

As a method for reducing phosphoric acid concentration in waste water, a method wherein a complex metal hydroxide is used, is disclosed in Japanese Unexamined Patent Publication No. H11-57695. On the other hand in the field of pharmaceuticals, a polymer bonded to a guanidino group is disclosed in Japanese Unexamined Patent Publication No. H08-506846 in use for the medical treatment of hyperphosphatemia. However, a complex metal hydroxide and a polymer bonded to a guanidino group have weak bonding strength to a phosphate group. Hence, there is a problem that a large quantity of complex metal hydroxide or a polymer bonded to a guanidino group as a bonding substrate to a phosphate group has to be used in order to capture a predetermined quantity of phosphoric acid.

On the other hand, as a compound that strongly bonds to a phosphate group, a macrocyclic polyamine zinc complex is disclosed in Journal of the American Chemical Society (the United States of America), Vol. 113, NO. 23, p. 8935-8941, (1991). However, a macrocyclic polyamine zinc complex is soluble to a solvent. Hence, there is a problem that it is very difficult to separate and purify a substance having a phosphate group bonded to a macrocyclic polyamine zinc complex, in a solvent.

Accordingly, for the purpose of separating and purifying a substance having a phosphate group such as a phosphorylated biological substance and the like, a capturing agent has been sought after which has, under a certain condition, characteristics of strongly bonding to a phosphate group that is one of anionic substituents and of being easily separated and purified as well, and is also safe and inexpensive.

The objective of the present invention is to provide a capturing agent which bonds, under a certain condition, to an anionic substituent (a phosphate group, for example) and also makes it easy to separate and purify a substance having the said subsitituent and is safe and inexpensive, a simple and convenient capturing apparatus filled with the said capturing agent, and an easy and prompt capture method thereof.

DISCLOSURE OF THE INVENTION

As a result of an extensive study to solve the above mentioned problems of the prior art, the inventors of the present invention have found that, when a polymer carrier is bonded to a specific zinc complex group, the said polymer carrier has a characteristic of strongly bonding to an anionic substituent (a phosphate group, for example), and shows low solubility to a solvent (preferably insolubility to a solvent) as a whole, and thus makes the separation and the purification very easy, that is to say, can make a useful capturing agent for a substance having the said substituent, and further have established an apparatus for capturing the said substance filled with the capturing agent, and also a method for capturing the said substance wherein the capturing agent is employed, and have accomplished the present invention.

Namely present invention (1) relates to a polymer carrier with a zinc complex group represented by general formula (1):

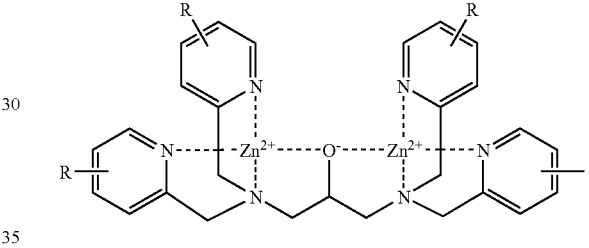

{wherein R, which may be identical or different each other, is a hydrogen atom; an alkyl group of 1 to 16 carbon atoms; an acyl group, an alkoxycarbonyl group, an acylalkyl group, an alkoxycarbonylalkyl group, a carboxyalkyl group, a carbamoylalkyl group, a cyanoalkyl group, a hydroxyalkyl group, an aminoalkyl group, or a haloalkyl group (wherein the alkyl part thereof is of 1 to 16 carbon atoms); a carboxyl group; a carbamoyl group; a cyano group; a hydroxyl group; an amino group; or a halogeno group} bound thereto directly or through a spacer.

Also, present invention (2) relates to a capturing agent containing a polymer carrier according to aforementioned invention (1) or a polymer carrier with a zinc complex group represented by general formula (2):

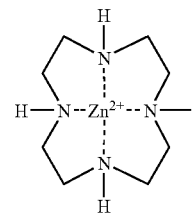

bound thereto directly or through a spacer, for capturing a substance having an anionic substituent.

Further, present invention (3) relates to a capturing agent according to aforementioned invention (2), wherein an anionic substituent is a phosphate group.

Also, present invention (4) relates to a capturing agent according to invention (2) or (3), wherein the capturing agent is of a bead form.

Further, present invention (5) relates to a capturing agent according to invention (2) or (3), wherein the capturing agent is of a plate form.

Also, present invention (6) relates to a capturing agent according to invention (2) or (3), wherein the capturing agent is of a fibrous form.

Further, present invention (7) relates to an apparatus for capturing a substance having an anionic substituent having filtrating function by a filter, filled with the capturing agent according to any one of aforementioned inventions (2) to (4) or (6)

Also, present invention (8) relates to a method for capturing a substance having an anionic substance comprising a process wherein a substance having an anionic subtituent is captured by being bound to the capturing agent according to any one of aforementioned inventions (2) to (6).

Further, present invention (9) relates to a method according to abovementioned invention (8), which further comprises a process wherein the captured substance having an anionic substituent is dissociated from the capturing agent subsequent to the said capturing process.

THE BEST MODE FOR CARRYING OUT THE INVENTION

Figure 1:
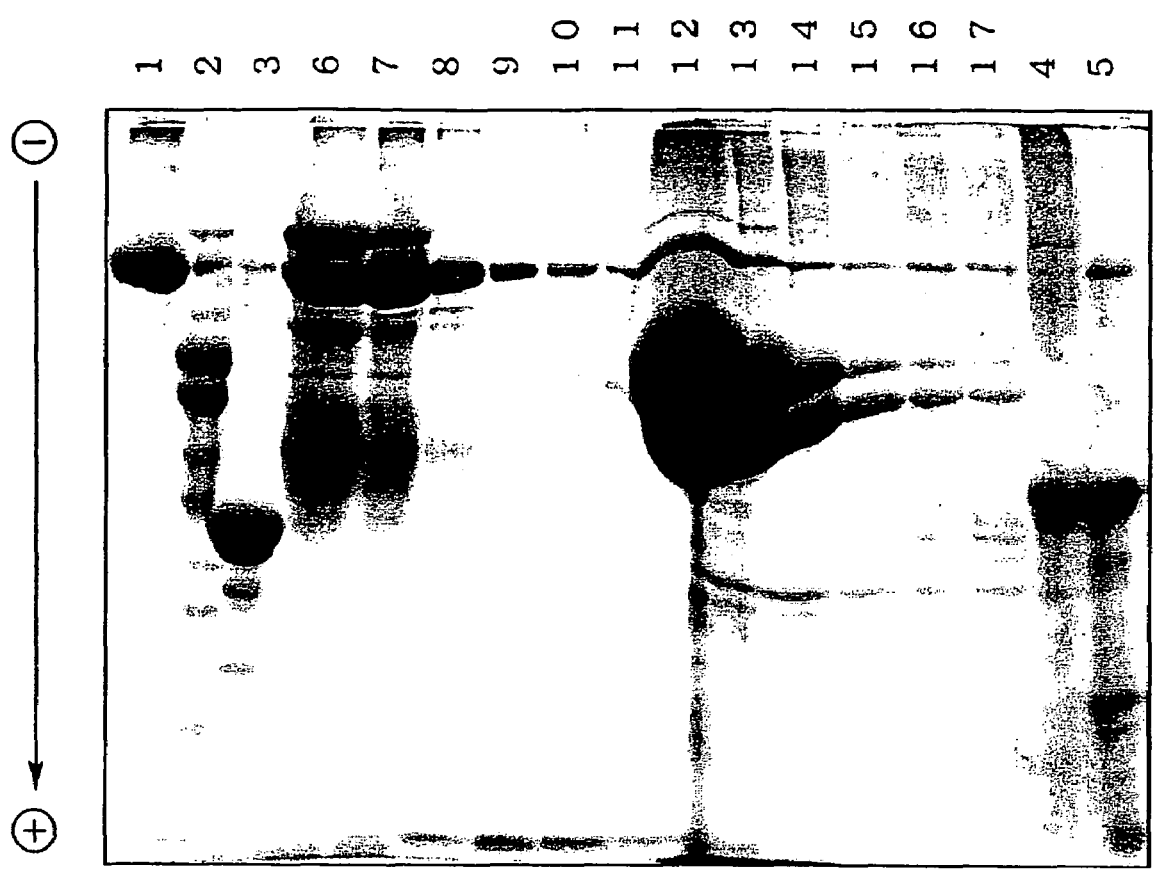
FIG. 1 is the first half of the drawing of sodium dodecyl-sulfate-polyacrylamide gel electrophoresis (SDS-PAGE) wherein a capturing agent containing a polymer carrier with a zinc complex group bound thereto is employed.

First, a polymer carrier with a zinc complex group represented by general formula (1) or general formula (2) bound thereto, will be explained. A "polymer carrier" is a polymer that can bond to the said group, and is not specifically limited so long as it functions as a "carrier" or a "support". However, it is preferable to have resistance to a solvent or to a reagent chemical to be employed upon using the same, and also to have a physical strength required of upon filtrating and washing. Also, a polymer carrier that has no influence on the capture of a substance having an anionic substituent is preferred. Concrete examples include polystyrene, polyethylene, polypropylene, polyacetylene (polyene), polyvinylchloride, polyvinylester, polyvinylether, polyacrylic ester, polyacrylic acid, polyacrylonitrile, polyacrylamide, polymethacrylic ester, polymethacrylic acid, polymethacrylonitrile, polymethacrylamide, polyether, polyacetal, polyester, polyethyleneterephthalate(polyterephthalicacidethylene), polycarbonate, polyamide, nylon, polyurethane, polyurea, polyimide, polyimidazole, polyoxazole, polysulfide, polysulfone, polysulfonamide, polymer alloy, cellulose, dextran, agarose, chitosan, silica, and the like. In addition, a polymer carrier having a crosslinked (bridged) structure may preferably be used for the purpose of securing a higher physical strength thereof, and concrete examples of crosslinking (bridging) agent include divinylbenzene, epichlorhydrin, N,N-methylenebisacrylamide, 4,4'-diphenylmethane diisocyanate, and the like.

The polymer carrier is bound directly or through a spacer to a zinc complex group represented by general formula (1) or general formula (2). The spacer herein is a polymer introduced for the purpose of accelerating the bonding of a zinc complex group to a substance being captured and increasing the degree of swelling by a solvent, by distancing the zinc complex group from the polymer carrier, and concrete examples include polyethyleneglycol, polyacrylamide, polyethylene, polyamide, polyester, and the like. Further, concrete examples of bonding patterns between a zinc complex group and a polymer carrier or a spacer, include covalent bonds such as carbon-carbon bond, ester bond, carbonyl bond, amide bond, ether bond, sulfide bond, amino bond, imino bond, and the like.

Concrete examples of a polymer carrier with a zinc complex group represented by general formula (1) bound thereto according to the present invention, include TOYOPEARL (Registered Trade Mark) with $Zn^{2+}_2$—N,N,N',N'-tetrakis[(2-pyridyl)methyl]-1,3-diamino-2-propoxide group bound thereto:

ArgoGel (Registered Trade Mark) with $Zn^{2+}{}_2$—N,N,N',N'-tetrakis[(2-pyridyl)methyl]-1,3-diamino-2-propoxide group bound thereto:

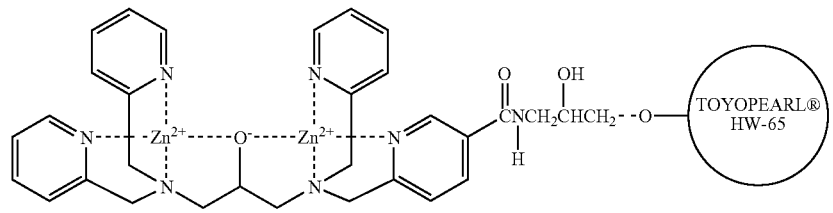

TSKgel (Registered Trade Mark) with $Zn^{2+}{}_2$—N,N,N',N'-tetrakis[(2-pyridyl)methyl]-1,3-diamino-2-propoxide group bound thereto:

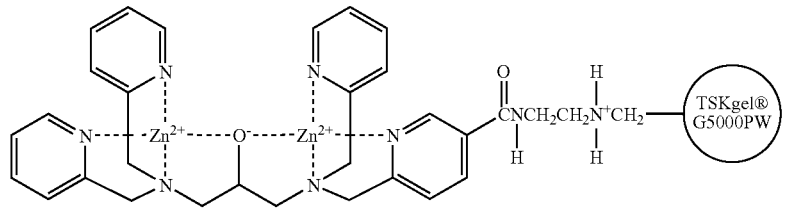

Sepharose (Trade Mark) with $Zn^{2+}{}_2$—N,N,N',N'-tetrakis[(2-pyridyl)methyl]-1,3-diamino-2-propoxide group bound thereto:

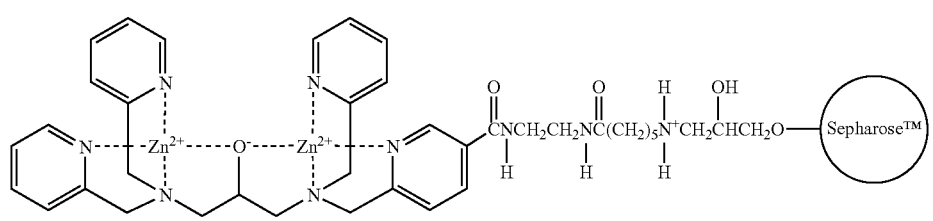

and the like.

Concrete examples of a polymer carrier with a zinc complex group represented by general formula (2) bound thereto according to the present invention, include TOYOPEARL (Registered Trade Mark) with $Zn^{2+}$-cyclene group bound thereto:

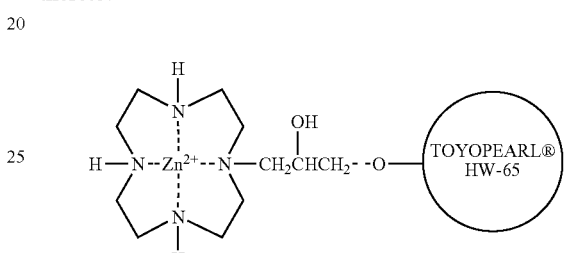

ArgoGel (Registered Trade Mark) with $Zn^{2+}$-cyclene group bound thereto:

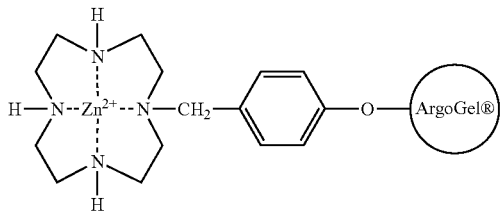

TentaGel (Registered Trade Mark) with $Zn^{2+}$-cyclene group bound thereto:

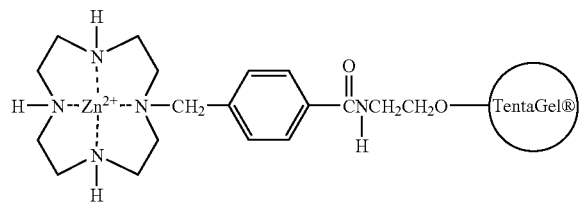

and the like.

An anionic substituent is a substituent having a negative charge, and concrete examples of anions include a phosphate monoester dianion ($-OPO_3^{2-}$), a phosphate diester monoanion (($-O)_2PO_2^-$), a phosphonate dianion ($-PO_3^{2-}$), a phosphonate monoanion (($-)_2PO_2^-$), a carbonate ester monoanion ($-OCO_2^-$), a carboxylate monoanion ($-CO_2^-$), a sulfate ester monoanion ($-OSO_3^-$), a sulfonate monoanion ($-SO_3^-$), and the like.

A substance having a phosphate group is the one having a phosphate monoester dianion ($-OPO_3^{2-}$), and concrete examples of the said substances include a phosphorylated amino acid, a phosphorylated amino acid residue, a protein having a phosphorylated amino acid residue (phosphorylated protein), a polypeptide having a phosphorylated amino acid residue (phosphorylated polypeptide), an oligopeptide having a phosphorylated amino acid residue (phosphorylated oligopeptide), deoxyribonucleic acid (DNA), phospholipid, phosphorylated sugars, a phosphate component in blood, a phosphate component in waste water, and the like.

A zinc complex group represented by general formula (1) or general formula (2) per se is normally soluble in relation to a solvent. However it becomes poorly soluble (preferably insoluble) in relation to a solvent by being bonded to a polymer carrier. Therefore, since a polymer carrier according to the present invention can capture, under a suitable condition, a substance having an anionic substituent (a phosphate group, for example) in a solvent, and also can be filtered off and washed off out of the solvent as well, the said substance can be promptly and easily isolated and purified from the solvent. Further the capturing agent can also be used for the quantitative measurement of the said substance as well.

Concrete examples of the use for the capturing agent utilized in a bead form include a column carrier which is such as an immobilized metal affinity chromatography (IMAC) column, a filler for a column used for the purification or the concentration of a substance having a phosphate group such as a phosphorylated protein or deoxyribonucleic acid (DNA), a magnetic bead used for the isolation or the purification of a substance having a phosphate group, an medicine for capturing a phosphate component in blood used for the medical treatment of hyperphosphatemia, and the like.

Concrete examples of the use for the capturing agent utilized in a plate form include specimen substrate used in matrix assisted laser desorption ionization time of flight mass spectrometry (MALDI-TOF MS), a chip used for the purification or the detection of a protein or deoxyribonucleic acid (DNA), and the like.

Concrete examples of the use for the capturing agent utilized in a fibrous form include a separation membrane used for separating a substance having a phosphate group from the one having no phosphate group, a hollow fiber membrane filter, and the like.

An apparatus for capturing a substance having an anionic subtituent (a phosphate group, for example) according to the present invention is packed with a capturing agent containing the aforementioned polymer carrier or the capturing agent of a bead or a fibrous form, and has the function of filtrating and separating by a filter. A filter herein means a separator introduced for the purpose of filtering and separating by simple solid liquid separation, a solution wherein the capturing agent and a substance having the said substituent bound to the capturing agent and a substance that does not have the said substituent and cannot be bound to the capturing agent are dissolved, or a solution wherein the capturing agent and a substance dissociated from the capturing agent having the said subsitituent are dissolved, and concrete examples include glass filter, sintered metal filter, membrane filter, ultrafilter membrane, asbestos, glass wool, polyethylene, polypropylene, polytetrafluoroethylene, polyethersulfone, cellulose, and the like. The filter(s) may be placed not only under but also under and over the capturing agents to give an effect of restricting the fluidizing zone of the capturing agents as well by holding the same between the two filters.

Concrete examples of the apparatus for capturing a substance having an anionic substituent (a phosphate group, for example) according to the present invention include a column of TOYOPEARL (Registered Trade Mark) with $Zn^{2+}_2$—N,N,N',N'-tetrakis[(2-pyridyl)methyl]-1,3-diamino-2-propoxide group bound thereto, a column of Sepharose (Trade Mark) with $Zn^{2+}_2$—N,N,N',N'-tetrakis[(2-pyridyl)methyl]-1,3-diamino-2-propoxide group bound thereto, a column of TOYOPEARL (Registered Trade Mark) with $Zn^{2+}_2$-cyclene group bound thereto, a centrifugal filter unit of Sepharose (Trade Mark) with $Zn^{2+}_2$—N,N,N',N'-tetrakis[(2-pyridyl)methyl]-1,3-diamino-2-propoxide group bound thereto, and the like.

A method for capturing a substance having an anionic subsitituent (a phosphate group, for example) according to the present invention utilizes a principle that a zinc complex group bound to a polymer carrier bonds to the said substance. Further, the capturing of the said substance can be carried out in response to individual applications by selecting a polymer carrier of, for example, bead, plate, or fibrous form according to the scale and the type of the capturing of the said substance.

Further, a method for capturing a substance having an anionic substituent (a phosphate group, for example) according to the present invention, comprises bonding the said substance to a polymer carrier according to the present invention under, for example a neutral condition which is a physiological condition, and subsequently dissociating the said bonded substance from the polymer carrier according to the present invention by changing, for example, pH of the solution, the species of an acid and a salt thereof or an alkali and a salt thereof having buffering action, the concentration of the salt contained in the buffer solution or the solution, and the like.

The said substance can be captured and further the captured substance can be released as well due to it that bonding between the said substance and the polymer carrier according to the present invention changes depending upon, for example, pH of the solution, the species of an acid and a salt thereof or an alkali and a salt thereof having buffering action, the concentration of a salt contained in the buffer solution or the solution, and the like.

Furthermore, a method for capturing a substance having an anionic substituent (a phosphate group, for example) according to the present invention include a method wherein the said bonded substance is dissociated from a polymer carrier according to the present invention by adding a chelating agent, for example ethylenediaminetetraacetic acid (EDTA) and the like. The said substance captured can be released since a chelating agent, for example ethylenediaminetetraacetic acid (EDTA) and the like, pulls the zinc ion out of the bond between the said substance and a polymer carrier according to the present invention, and thereby the said bonded substance is dissociated.

Thereby, the separation and purification of a substance having an anionic substituent (a phosphate group, for example) can be carried out at will using the prompt and easy capturing method by changing, for example pH of the solution, the species of an acid and a salt thereof or an alkali and a salt thereof having buffering action, the concentration of a salt contained in the buffer solution or the solution, and the like, or by adding a chelating agent, for example ethylenediaminetetraacetic acid (EDTA) and the like.

EXAMPLES

The present invention will be hereinafter explained more concretely by way of examples, however the present invention shall not be limited by the examples described below. For reference, the bound quantity (unit, mmol $Zn^{2+}$/g or μmol $Zn^{2+}$/mL) of zinc ion ($Zn^{2+}$) is a value showing the zinc ion content against the total amount of the polymer carrier with a zinc complex group bound thereto.

Example 1

10 g of TOYOPEARL (Registered Trade Mark) AF-Epoxy-650M, 6.9 g of cyclene, 75 mL of ethanol solution of 2.2 g of potassium carbonate, were stirred for 4 days at 40° C. After filtering and washing the reaction liquid, the beads obtained and 75 mL of aqueous solution of 12 g of zinc nitrate hexahydrate were stirred for 2 days at 40° C. The reaction liquid was filtered and washed, and subsequently dried under a reduced pressure to obtain 12 g (0.3 mmol $Zn^{2+}$/g) of TOYOPEARL (Registered Trade Mark) with $Zn^{2+}$-cyclene group bound thereto.

Example 2

To a column equipped with a filter made of polyethylene, 100 mg (0.3 mmol $Zn^{2+}$/g) of TOYOPEARL (Registered Trade Mark) with $Zn^{2+}$-cyclene group bound thereto was filled to prepare a column of TOYOPEARL (Registered Trade Mark) with $Zn^{2+}$-cyclene group bound thereto.

Example 3

A column of TOYOPEARL (Registered Trade Mark) with $Zn^{2+}$-cyclene group bound thereto was swollen with 50 mM Tris-hydrochloric acid buffer solution (pH 7.0). To the column, 1.0 mL of 10 mM sodium 4-nitrobenzoate solution adjusted with 50 mM Tris-hydrochloric acid buffer solution (pH 7.0) was added, and subsequently 2.0 mL of 50 mM Tris-hydrochloric acid buffer solution (pH 7.0) was added and made to flow out. The liquid flowing out was collected, and the capturing yield of 4-nitrobenzoate monoanion was measured of the same liquid, using an ultraviolet-visible spectrophotometer, which was 100%.

Example 4

A column of TOYOPEARL (Registered Trade Mark) with $Zn^{2+}$-cyclene group bound thereto was swollen with 50 mM Tris-hydrochloric acid buffer solution (pH 7.0). To the column, 1.0 mL of 10 mM disodium 4-nitrophenylphosphate solution adjusted with 50 mM Tris-hydrochloric acid buffer solution (pH 7.0) was added, and subsequently 2.0 mL of 50 mM Tris-hydrochloric acid buffer solution (pH 7.0) was added and made to flow out. The liquid flowing out was collected, and the capturing yield of 4-nitrophenylphosphate dianion was measured of the same liquid, using an ultraviolet-visible spectrophotometer, which was 98%.

Example 5

33 g of 1,3-diamino-2-propanol, 116 g of 2-pyridinecarboxyaldehyde, 500 mL of methanol solution of 50 g of sodium cyanotrihydroborate were stirred for 3 days at a room temperature. Subsequent to an after treatment, they were purified by column chromatography to obtain 34 g of a synthesized intermediate.

18 g of the synthesized intermediate, 12 g of methyl 6-bromomethylnicotinate, and 225 mL of N,N-dimethylformamide solution of 14 g of potassium carbonate were stirred for 1 hour at 50° C. Subsequent to an after treatment, they were purified by column chromatography to obtain 22 g of the methylester product.

17 g of the methylester product and 40 mL of methanol solution of 83 mL of 1.0 M sodium hydroxide aqueous solution were stirred for 1 hour at a room temperature. After neutralizing, they were purified by column chromatography to obtain 13 g of N-(5-carboxy-2-pyridyl)methyl-N,N',N'-tris[(2-pyridyl)methyl]-1,3-diamino-2-propanol.

Example 6

1.2 g of TOYOPEARL (Registered Trade Mark) AF-Amino-650M and 450 mg of N-5-carboxy-2-pyridyl)methyl-N,N',N'-tris[(2-pyridyl)methyl]-1,3-diamino-2-propanol, 210 mg of dicyclohexylcarbodiimide, 10 mL of N,N-dimethylformamide solution of 150 mg of 1-hydroxybenzotriazol were stirred for 18 hours at 40° C. After filtering and washing the reaction liquid, the beads obtained, 480 mg of zinc acetate dihydrate, and 7.0 mL of ethanol solution of 0.10 mL of 10 M sodium hydroxide aqueous solution were stirred for 18 hours at 40° C. The beads obtained after filtering and washing the reaction liquid and 7.0 mL of aqueous solution of 3.0 mL of 1.0 M sodium perchlorate aqueous solution were stirred for 18 hours at 40° C. The reaction liquid was filtered and washed, and subsequently dried under a reduced pressure to obtain 1.0 g (0.5 mmol $Zn^{2+}$/g) of TOYOPEARL (Registered Trade Mark) with $Zn^{2+}{}_2$—N,N,N',N'-tetrakis[(2-pyridyl)methyl]-1,3-diamino-2-propoxide group bound thereto.

Example 7

To a column equipped with a filter made of polyethylene, 100 mg (0.5 mmol $Zn^{2+}$/g) of TOYOPEARL (Registered Trade Mark) with $Zn^{2+}{}_2$—N,N,N',N'-tetrakis[(2-pyridyl)methyl]-1,3-diamino-2-propoxide group bound thereto was filled to prepare a column of TOYOPEARL (Registered Trade Mark) with $Zn^{2+}{}_2$—N,N,N',N'-tetrakis[(2-pyridyl)methyl]-1,3-diamino-2-propoxide group bound thereto.

Example 8

A column of TOYOPEARL (Registered Trade Mark) with $Zn^{2+}{}_2$—N,N,N',N'-tetrakis[(2-pyridyl)methyl]-1,3-diamino-2-propoxide group bound thereto was swollen with 50 mM Tris-hydrochloric acid buffer solution (pH 7.0)/acetonitrile (1/1) solution. To the column, 1.0 mL of 10 mM sodium 4-nitrobenzoate solution adjusted with 50 mM Tris-hydrochloric acid buffer solution (pH 7.0)/acetonitrile (1/1) solution was added, and subsequently 2.0 mL of 50 mM Tris-hydrochloric acid buffer solution (pH 7.0)/acetonitrile (1/1) solution was added and made to flow out. The liquid flowing out was collected, and the capturing yield of 4-nitrobenzoate monoanion was measured of same the liquid, using an ultraviolet-visible spectrophotometer, which was 100%. Subsequently, 50 mL of 50 mM phosphate buffer solution (pH 3.0)/acetonitrile (1/1) solution was added and made to flow out. The liquid flowing out was collected, and the recovery of 4-nitrobenzoate monoanion was measured of the same liquid, using an ultraviolet-visible spectrophotometer, which was 100%.

Example 9

A column of TOYOPEARL (Registered Trade Mark) with $Zn^{2+}{}_2$—N,N,N',N'-tetrakis[(2-pyridyl)methyl]-1,3-diamino-2-propoxide group bound thereto was swollen with 50 mM Tris-hydrochloric acid buffer solution (pH 7.0). To the column 1.0 mL of 10 mM disodium 4-nitrophenylphosphate solution adjusted with 50 mM Tris-hydrochloric acid buffer solution (pH 7.0) was added, and subsequently 2.0 mL of 50 mM Tris-hydrochloric acid buffer solution (pH 7.0) was added and made to flow out. The liquid flowing out was collected, and the capturing yield of 4-nitrophenylphosphate dianion was measured of the same liquid, using an ultraviolet-visible spectrophotometer, which was 100%. Subsequently, 50 mL of 50 mM phosphate buffer solution (pH 3.0) was added as an elution liquid and made to flow out. The liquid flowing out was collected, and the recovery of 4-nitrophenylphosphate dianion was measured of the same liquid, using an ultraviolet-visible spectrophotometer, which was 89%. However, when 50 mL of 50 mM Tris-hydrochloric acid buffer solution (pH 7.0) was added as an elution liquid and made to flow out and collected, the recovery of 4-nitrophenylphosphate dianion measured of the same liquid using an ultraviolet-visible spectrophotometer was 0%.

Example 10

33 g of 1,3-diamino-2-propanol, 116 g of 2-pyridinecarboxyaldehyde, and 500 mL of methanol solution of 50 g of sodium cyanotrihydroborate were stirred for 3 days at a room temperature. Subsequent to an after treatment, they were purified by column chromatography to obtain 34 g of a synthesized intermediate.

18 g of the synthesized intermediate, 12 g of methyl 6-bromomethylnicotinate, and 225 mL of N,N-dimethylformamide solution of 14 g of potassium carbonate were stirred for 1 hour at 50° C. Subsequent to an after treatment, they were purified by column chromatography to obtain 22 g of the methylester product.

10 g of the methylester product and 100 mL of methanol solution of 23 g of ethylenediamine were stirred for 3 days at a room temperature. Subsequent to an after treatment, they were purified by column chromatography to obtain 10 g of N-{5-[N-(2-amino)ethyl]carbamoyl-2-pyridyl}methyl-N,N',N'-tris[(2-pyridyl)methyl]-1,3-diamino-2-propanol.

Example 11

5.0 mL of 20 mM acetonitrile solution of NHS-activated Sepharose (Trade Mark) 4FF and 5.0 mL of 5.0 mM acetonitrile solution of N-{5-[N-(2-amino)ethyl]carbamoyl-2-pyridyl}methyl-N,N',N'-tris[(2-pyridyl)methyl]-1,3-diamino-2-propanol were stirred for 1 hour at 50° C. The reaction liquid was filtered and washed, and subsequently washed with 20 mM aqueous solution of sodium carbonate to obtain 5.0 mL of Sepharose (Trade Mark) with N,N,N',N'-tetrakis[(2-pyridyl)methyl]-1,3-diamino-2-propanol group bound thereto.

Example 12

To a column equipped with a filter made of polypropylene, 1.0 mL of Sepharose (Trade Mark) with N,N,N',N'-tetrakis[(2-pyridyl)methyl]-1,3-diamino-2-propanol group bound thereto was filled, and was equilibrated with 5.0 mL of a mixed solution of 100 mM 2-(N-morpholino) ethanesulfonic acid (MES) buffer solution (pH 6.0) and 20 mM zinc acetate aqueous solution, 5.0 mL of a mixed solution of 100 mM 2-(N-morpholino)ethanesulfonic acid (MES) buffer solution (pH 6.0) and 0.1 mM zinc acetate aqueous solution, and 5.0 mL of a mixed solution of Tris-hydrochloric acid buffer solution (pH 7.0) and 0.5 M sodium chloride aqueous solution, to prepare a column of Sepharose (Trade Mark) with $Zn^{2+}{}_2$—N,N,N',N'-tetrakis[(2-pyridyl)methyl]-1,3-diamino-2-propoxide group bound thereto.

Example 13

Figure 2:
FIG. 2 is the latter half of the drawing of sodium dodecyl-sulfate-polyacrylamide gel electrophoresis (SDS-PAGE) wherein a capturing agent containing a polymer carrier with a zinc complex group bound thereto is employed.

To a column of Sepharose (Trade Mark) with $Zn^{2+}{}_2$—N,N,N',N'-tetrakis[(2-pyridyl)methyl]-1,3-diamino-2-propoxide group bound thereto, 50 μg of bovine serum albumin (molecular weight: 66,000, phosphorylated serine residue×0), 50 μg of chicken ovalbumin (molecular weight: 45,000, phosphorylated serine residue×2), 50 μg of bovine $\alpha_{s1}$-casein (molecular weight: 24,000, phosphorylated serine residue×8), 50 μg of bovine $\alpha_{s1}$-casein of unphosphorylated type (molecular weight: 24,000, phosphorylated serine residue×0), and 50 μg of bovine β-casein (molecular weight: 25,000, phosphorylated serine residue×5) were added. Subsequently, 1.0 mL each twice, of a mixed solution of Tris-hydrochloric acid buffer solution (pH 7.0) and 0.5 M sodium chloride aqueous solution, 1.0 mL each four times, of Tris-acetate buffer solution (pH 7.0), 1.0 mL of 10 mM phosphate buffer solution (pH 7.0), 1.0 mL of 15 mM phosphate buffer solution (pH 7.0), 1.0 mL of 20 mM phosphate buffer solution (pH 7.0), 1.0 mL of 25 mM phosphate buffer solution (pH 7.0), 1.0 mL of 30 mM phosphate buffer solution (pH 7.0), 1.0 mL of 35 mM phosphate buffer solution (pH 7.0), 1.0 mL of 40 mM phosphate buffer solution (pH 7.0), 1.0 mL of 45 mM phosphate buffer solution (pH 7.0), 1.0 mL of 50 mM phosphate buffer solution (pH 7.0), 1.0 mL of 60 mM phosphate buffer solution (pH 7.0), 1.0 mL of 70 mM phosphate buffer solution (pH 7.0), 1.0 mL of 80 mM phosphate buffer solution (pH 7.0), 1.0 mL of 90 mM phosphate buffer solution (pH 7.0), 1.0 mL of 100 mM phosphate buffer solution (pH 7.0), 1.0 mL of 200 mM phosphate buffer solution (pH 7.0), 1.0 mL of 300 mM phosphate buffer solution (pH 7.0), 1.0 mL of 400 mM phosphate buffer solution (pH 7.0), and 1.0 mL of 500 mM phosphate buffer solution (pH 7.0) were added one after another and made to flow out. The liquid having flowed out was concentrated, then spotted, and separated by sodium dodecylsulfate-polyacrylamide gel electrophoresis (SDS-PAGE), and subsequently stained with Coomassie brilliant blue (CBB). The first half of the electrophoresis chart is shown in FIG. 1, and the latter half, in FIG. 2. In FIGS. 1 and 2, it was confirmed that bovine serum albumin without having a phosphorylated serine residue had been first flowed out, and subsequently, in order of fewer phosphorylated serine residue, chicken ovalbumin, bovine β-casein, and bovine $\alpha_{s1}$-casein had been flowed out.

Example 14

To a micropipette chip, a filter made of cellulose was packed, and then 10 μL of Sepharose (Trade Mark) with $Zn^{2+}{}_2$—N,N,N',N'-tetrakis[(2-pyridyl)methyl]-1,3-diamino-2-propoxide group bound thereto taken out of a column of Sepharose (Trade Mark) with $Zn^{2+}{}_2$—N,N,N',N'-tetrakis[(2-pyridyl)methyl]-1,3-diamino-2-propoxide group bound thereto, was filled. The chip was subsequently covered with a filter made from cellulose, to prepare a chip of Sepharose (Trade Mark) with $Zn^{2+}{}_2$—N,N,N',N'-tetrakis[(2-pyridyl)methyl]-1,3-diamino-2-propoxide group bound thereto.

Example 15

Using the micropipette equipped with a chip of Sepharose (Trade Mark) with $Zn^{2+}{}_2$—N,N,N',N'-tetrakis[(2-pyridyl)methyl]-1,3-diamino-2-propoxide group bound thereto, 10 μL of a mixed solution of 0.22 mM $p60^{c-src}$peptide 521-533 and 0.18 mM phosphorylated $p60^{c-src}$peptide 521-533 adjusted with 100 mM Tris-acetate buffer solution (pH 7.4) containing 0.50 M sodium nitrate was sucked in, and they were equilibrated for 5 minutes, and subsequently discharged. Then the chip was washed five times each with 10 μL of 100 mM Tris-acetate buffer solution (pH 7.4) containing 0.50 M sodium nitrate, and was subsequently washed six times each with 10 μL of 10 mM phosphate buffer solution (pH 7.0). The washing liquid was collected, and the purity of phosphorylated $p60^{c-src}$peptide 521-533 was measured to be 100%, and that of $p60^{c-src}$peptide 521-533 was measured to be 0%, using high performance liquid chromatography.

Example 16

Onto a PS20 ProteinChip (Registered Trade Mark) Array, 3.0 μL of 0.38 M N-{5-[N-(2-amino)ethyl]carbamoyl-2-pyridyl}methyl-N,N',N'-tris[(2-pyridyl)methyl]-1,3-diamino-2-propanol solution adjusted with 100 mM sodium hydrogencarbonate aqueous solution/acetonitrile (1/3) solution was placed, and they were reacted for 4 hours at a room temperature. Further, 3.0 μL of 0.50 M 2-aminoethanol solution adjusted with 100 mM sodium hydrogencarbonate aqueous solution was placed, and they were reacted for 4 hours at a room temperature. After washing, they were washed with 0.50 M zinc acetate solution adjusted with 100 mM 2-(N-morpholino)ethanesulfonic acid(MES) buffer solution (pH 6.0) to obtain a ProteinChip (Registered Trade Mark) Array with $Zn^{2+}{}_2$—N,N,N',N'-tetrakis[(2-pyridyl)methyl]-1,3-diamino-2-propoxide group bound thereto.

Example 17

Onto a ProteinChip (Registered Trade Mark) Array with $Zn^{2+}{}_2$—N,N,N',N'-tetrakis[(2-pyridyl)methyl]-1,3-diamino-2-propoxide group bound thereto, 3.0 μL of 0.94 mM disodium 4-methylumberriferyl phosphate solution adjusted with 100 mM Tris-acetate buffer solution (pH 7.4) was placed, and they were equilibrated for 1 hour at a room temperature, and then recovered. The recovered liquid was collected, and the capturing yield of 4-methylumberriferyl phosphate dianion was measured of the recovered liquid using an ultraviolet-visible spectrophotometer, which was 16%.

Comparative Example 1

To a column equipped with a filter made of polyethylene, 100 mg of TOYOPEARL (registered Trade Mark) AF-Epoxy-650M was filled, and it was swollen with 50 mM Tris-hydrochloric acid buffer solution (pH 7.0). To the column, 1.0 mL of 10 mM disodium 4-nitrophenylphosphate solution adjusted with 50 mM Tris-hydrochloric acid buffer solution (pH 7.0) was added, and subsequently made to flow out by adding 2.0 mL of 50 mM Tris-hydrochloric acid buffer solution (pH 7.0). The liquid flowing out was collected, and the capturing yield of 4-nitrophenylphosphate dianion was measured of the same liquid using an ultraviolet-visible spectrophotometer, which was 0.5%.

Comparative Example 2

Figure 3:
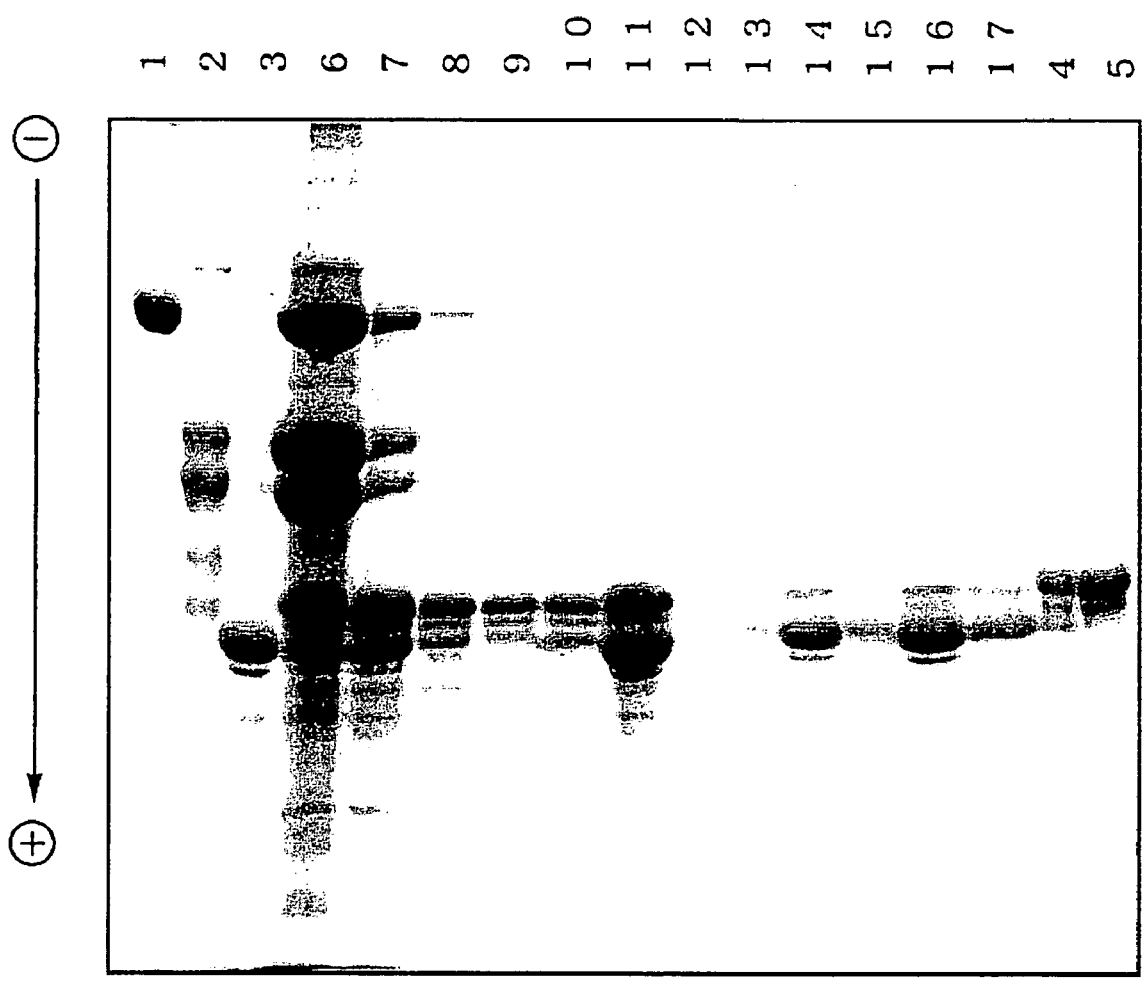
FIG. 3 is the first half of the drawing of sodium dodecyl-sulfate-polyacrylamide gel electrophoresis (SDS-PAGE) wherein a capturing agent containing a polymer carrier with a complex group that does not contain zinc bound thereto is employed.
Figure 4:
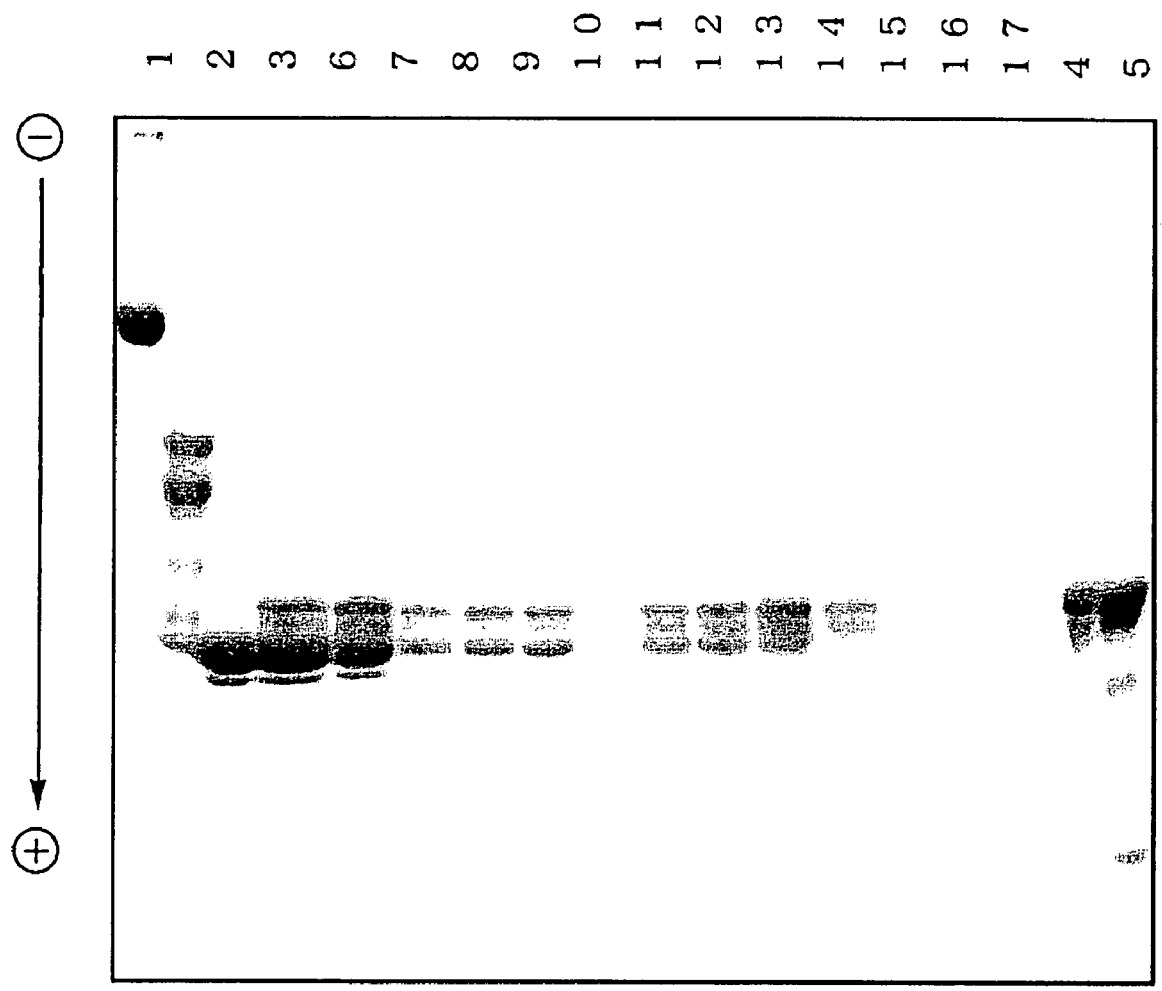
FIG. 4 is the latter half of the drawing of sodium dodecyl-sulfate-polyacryalamide electrophoresis (SDS-PAGE) wherein a capturing agent containing a polymer carrier with a complex group that does not contain zinc bound thereto is employed. In these drawings for reference, 1 indicates the line for bovine serum albumin, 2 for chicken ovalbumin, 3 for bovine β-casein, 4 for bovine $\alpha_{S1}$-casein of unphosphorylated type, 5 for bovine $\alpha_{S1}$-casein, 6 for the first run of a mixed solution of Tris-hydrochloric acid buffer solution (pH 7.0) and 0.5 M sodium chloride aqueous solution, 7 for the second run of the mixed solution of Tris-hydrochloric acid buffer solution (pH 7.0) and 0.5 M sodium chloride aqueous solution, 8 for the first run of Tris-acetate buffer solution (pH 7.0), 9 for the second run of Tris-acetate buffer solution (pH 7.0), 10 for the third run of Tris-acetate buffer solution (pH 7.0), 11 for the fourth run of Tris-acetate buffer solution (pH 7.0), 12 for 10 mM phosphate buffer solution (pH 7.0), 13 for 15 mM phosphate buffer solution (pH 7.0), 14 for 20 mM phosphate buffer solution (pH 7.0), 15 for 25 mM phosphate buffer solution (pH 7.0), 16 for 30 mM phosphate buffer solution (pH 7.0), 17 for 35 mM phosphate buffer solution (pH 7.0), 18 for 40 mM phosphate buffer solution (pH 7.0), 19 for 45 mM phosphate buffer solution (pH 7.0), 20 for 50 mM phosphate buffer solution (pH 7.0), 21 for 60 mM phosphate buffer solution (pH 7.0), 22 for 70 mM phosphate buffer solution (pH 7.0), 23 for 80 mM phosphate buffer solution (pH 7.0), 24 for 90 mM phosphate buffer solution (pH 7.0), 25 for 100 mM phosphate buffer solution (pH 7.0), 26 for 200 mM phosphate buffer solution (pH 7.0), 27 for 300 mM phosphate buffer solution (pH 7.0), 28 for 400 mM phosphate buffer solution (pH 7.0), and 29 indicates the line for 500 mM phosphate buffer solution (pH 7.0).

To a column equipped with a filter made of polypropylene, 1.0 mL of Sepharose (Trade Mark) with N,N,N',N'-tetrakis[(2-pyridyl)methyl]-1,3-diamino-2-propanol group bound thereto was filled, and it was equilibrated with 5.0 mL of a mixed solution of Tris-hydrochloric acid buffer solution (pH 7.0) and 0.5M sodium chloride aqueous solution. To the column 50 μg of bovine serum albumin (molecular weight: 66,000, phosphorylated serine residue×0), 50 μg of chicken ovalbumin (molecular weight: 45,000, phosphorylated serine residue×2), 50 μg of bovine $\alpha_{s1}$-casein (molecular weight: 24,000, phosphorylated serine residue×8), 50 μg of bovine $\alpha_{s1}$-casein of unphosphorylated type (molecular weight: 24,000, phosphorylated serine residue×0), and 50 μg of bovine β-casein (molecular weight: 25,000, phosphorylated serine residue×5) were added. Subsequently, 1.0 mL each twice, of a mixed solution of Tris-hydrochloric acid buffer solution (pH 7.0) and 0.5 M sodium chloride aqueous solution, 1.0 mL each four times, of Tris-acetate acid buffer solution (pH 7.0), 1.0 mL of 10 mM phosphate buffer solution (pH 7.0), 1.0 mL of 15 mM phosphate buffer solution (pH 7.0), 1.0 mL of 20 mM phosphate buffer solution (pH 7.0), 1.0 mL of 25 mM phosphate buffer solution (pH 7.0), 1.0 mL of 30 mM phosphate buffer solution (pH 7.0), 1.0 mL of 35 mM phosphate buffer solution (pH 7.0), 1.0 mL of 40 mM phosphate buffer solution (pH 7.0), 1.0 mL of 45 mM phosphate buffer solution (pH 7.0), 1.0 mL of 50 mM phosphate buffer solution (pH 7.0), 1.0 mL of 60 mM phosphate buffer solution (pH 7.0), 1.0 mL of 70 mM phosphate buffer solution (pH 7.0), 1.0 mL of 80 mM phosphate buffer solution (pH 7.0), 1.0 mL of 90 mM phosphate buffer solution (pH 7.0), 1.0 mL of 100 mM phosphate buffer solution (pH 7.0), 1.0 mL of 200 mM phosphate buffer solution (pH 7.0), 1.0 mL of 300 mM phosphate buffer solution (pH 7.0), 1.0 mL of 400 mM phosphate buffer solution (pH 7.0), and 1.0 mL of 500 mM phosphate buffer solution (pH 7.0) were added one after another and made to flow out. The liquid having flowed out was concentrated, then spotted, and separated by sodium dodecylsulfate-polyacrylamide gel electrophoresis (SDS-PAGE), and subsequently stained with Coomassie brilliant blue (CBB). The first half of the electrophoresis chart is shown in FIG. 3, and the latter half, in FIG. 4. In FIGS. 3 and 4, it was confirmed that bovine serum albumin first, then chicken ovalbumin, bovine β-casein, and bovine $\alpha_{s1}$-casein had been flowed out one after another.

INDUSTRIAL APPLICABILITY

A polymer carrier with a prescribed zinc complex group bound thereto according to the present invention bonds under a certain condition, to an anionic substituent (a phosphate group, for example) and also is poorly soluble (preferably insoluble) as a whole to a solvent, and therefore can be used as an inexpensive and safe capturing agent that makes the separation and purification of a substance having the said substituent easy. Further, by using the polymer carrier, a capturing apparatus that can make the separation and purification by a filter simple and easy, and a simple and prompt capturing method wherein the substance is made to bond under a neutral condition and subsequently released under a certain condition, would be provided.

The invention claimed is:

1. A polymer carrier with a zinc complex group represented by general formula (1):

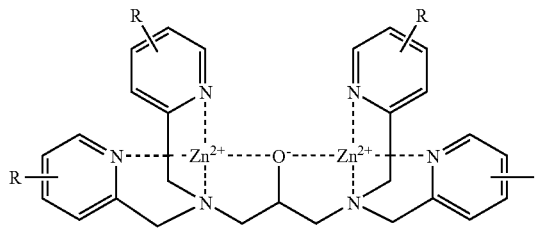

{wherein each R, which may be identical or different from each other, is either a hydrogen atom; an alkyl group of 1 to 16 carbon atoms; an acyl group, an alkoxycarbonyl group, an acylalkyl group, an alkoxycarbonylalkyl group, a carboxyalkyl group, a carbamoylalkyl group, a cyanoalkyl group, a hydroxyalkyl group, an aminoalkyl group, or a haloalkyl group (wherein the alkyl part thereof is of 1 to 16 carbon atoms); a carboxyl group; a carbamoyl group; a cyano group; a hydroxyl group; an amino group; or a halogeno group} bound thereto directly or through a spacer.

2. A capturing agent for a substance having an anionic substituent, containing a polymer cater according to claim 1 bound thereto directly or through a spacer.

3. A capturing agent according to claim 2 wherein the anionic substituent is a phosphate group.

4. A capturing agent according to claim 2 wherein the capturing agent is of a bead form.

5. A capturing agent according to claim 2 wherein the capturing agent is of a plate form.

6. A capturing agent according to claim 2 wherein the capturing agent is of a fibrous form.

7. An apparatus for capturing a substance having an anionic substituent, having filtrating function by a filter, filled with the capturing agent according to claim 2.

8. A method for capturing a substance having an anionic substituent comprising a process wherein a substance having an anionic substituent is captured by being bound to the capturing agent according to claim 2.

9. A method according to claim 8 which further comprises a process wherein the captured substance having an anionic substituent is dissociated from the capturing agent subsequent to the said capturing process.

10. A capturing agent according to claim 3 wherein the capturing agent is of a bead form.

11. A capturing agent according to claim 3 wherein the capturing agent is of a plate form.

12. A capturing agent according to claim 3 wherein the capturing agent is of a fibrous form.

13. An apparatus for capturing a substance having an anionic substituent, having filtrating function by a filter, filled with the capturing agent according to claim 3.

14. An apparatus for capturing a substance having an anionic substituent, having filtrating function by a filter, filled with the capturing agent according to claim 4.

15. An apparatus for capturing a substance having an anionic substituent, having filtrating function by a filter, filled with the capturing agent according to claim 6.

16. An apparatus for capturing a substance having an anionic substituent, having filtrating function by a filter, filled with the capturing agent according to claim 10.

17. An apparatus for capturing a substance having an anionic substituent, having filtrating function by a filter, filled with the capturing agent according to claim 12.

18. A method for capturing a substance having an anionic substituent comprising a process wherein a substance having an anionic substituent is captured by being bound to the capturing agent according to claim 3.

19. A method for capturing a substance having an anionic substituent comprising a process wherein a substance having an anionic substituent is captured by being bound to the capturing agent according to claim 4.

20. A method for capturing a substance having an anionic substituent comprising a process wherein a substance having an anionic substituent is captured by being bound to the capturing agent according to claim 5.

21. A method for capturing a substance having an anionic substituent comprising a process wherein a substance having an anionic substituent is captured by being bound to the capturing agent according to claim 6.

22. A method for capturing a substance having an anionic substituent comprising a process wherein a substance having an anionic substituent is captured by being bound to the capturing agent according to claim 10.

23. A method for capturing a substance having an anionic substituent comprising a process wherein a substance having an anionic substituent is captured by being bound to the capturing agent according to claim 11.

24. A method for capturing a substance having an anionic substituent comprising a process wherein a substance having an anionic substituent is captured by being bound to the capturing agent according to claim 12.

25. A method according to claim 18 which further comprises a process wherein the captured substance having an anionic compound substituent is dissociated from the capturing agent subsequent to the said capturing process.

26. A method according to claim 19 which further comprises a process wherein the captured substance having an anionic compound substituent is dissociated from the capturing agent subsequent to the said capturing process.

27. A method according to claim 20 which further comprises a process wherein the captured substance having an anionic compound substituent is dissociated from the capturing agent subsequent to the said capturing process.

28. A method according to claim 21 which further comprises a process wherein the captured substance having an anionic compound substituent is dissociated from the capturing agent subsequent to the said capturing process.

29. A method according to claim 22 which further comprises a process wherein the captured substance having an anionic compound substituent is dissociated from the capturing agent subsequent to the said capturing process.

30. A method according to claim 23 which further comprises a process wherein the captured substance having an anionic compound substituent is dissociated from the capturing agent subsequent to the said capturing process.

31. A method according to claim 24 which further comprises a process wherein the captured substance having an anionic compound substituent is dissociated from the capturing agent subsequent to the said capturing process.

* * * * *

UNITED STATES PATENT AND TRADEMARK OFFICE
CERTIFICATE OF CORRECTION

| | | |
|---|---|---|
| PATENT NO. | : 7,473,781 B2 | Page 1 of 1 |
| APPLICATION NO. | : 10/547050 | |
| DATED | : January 6, 2009 | |
| INVENTOR(S) | : Tohru Koike et al. | |

It is certified that error appears in the above-identified patent and that said Letters Patent is hereby corrected as shown below:

In the Claims:

In Claim 2, column 15, line 52, the word "cater" should be --ca<u>rr</u>ier--.

Signed and Sealed this

Seventeenth Day of March, 2009

JOHN DOLL
*Acting Director of the United States Patent and Trademark Office*